J. R. CROSS.

Processes of Transferring the Grain-Marks of Wood.

No. 5,377. Reissued April 29, 1873.

Witnesses:

H. L. Wattenberg

W. J. Lovell

Inventor:

John R. Cross per G. Ennis Pratt

Atty.

UNITED STATES PATENT OFFICE.

JOHN R. CROSS, OF NEW YORK, N. Y., ASSIGNOR TO HIMSELF AND ANDREW J. BASTINE.

IMPROVEMENT IN PROCESSES OF TRANSFERRING THE GRAIN-MARKS OF WOOD.

Specification forming part of Letters Patent No. 128,468, dated July 2, 1872; reissue No. 5,377, dated April 29, 1873; application filed April 1, 1873.

*To whom it may concern:*

Be it known that I, JOHN R. CROSS, of the city, county, and State of New York, have invented a new and Improved Process of Transferring; and that the following is a full, clear, and exact description of the same, reference being had to the accompanying drawing and to the letters of reference marked thereon making a part of this specification:

This invention relates to an improvement in transferring grain-marks or other configurations or designs; and the invention consists in an elastic roller or curved surface having a smooth unornamented surface upon which are received the configurations or designs, and by means of which said configurations or designs are transferred to any desired surface.

Figure 1:
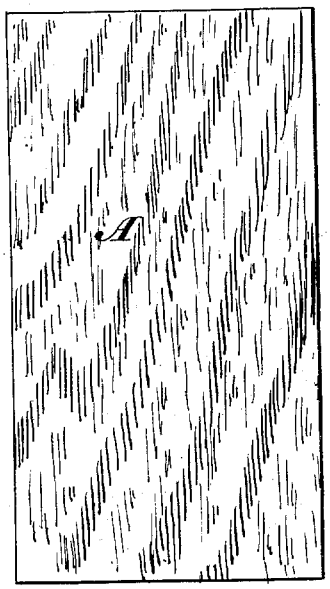
Figure 2:
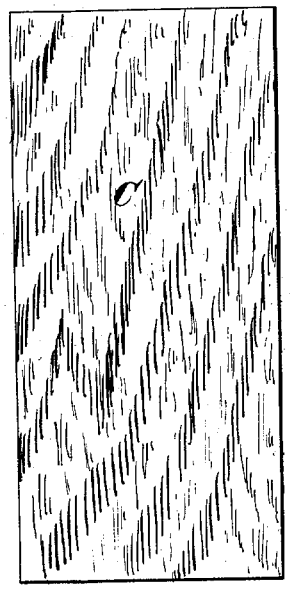
Figure 3:
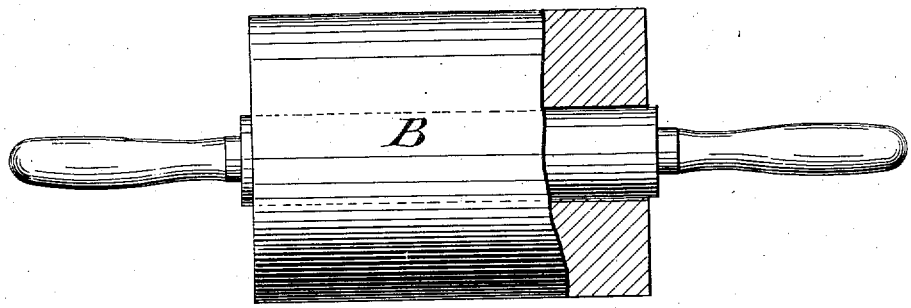

In the accompanying sheet of drawing, Figure 1 represents a board; Fig. 2, a grained surface; and Fig. 3, a roller.

Similar letters of reference indicate like parts in the several figures.

A represents a board of any kind of wood or other material having upon it clearly-defined grain-marks or other designs, whether natural or engraved. The surface of this board or other material is charged with any desirable color the configurations or designs being charged with the color. This being done, a roller, B, or a curved surface made of a composition of glue and molasses, or any other elastic material having a smooth and elastic surface, is now pressed over the board or other surface having the configurations or designs thereon, when the surface of the roller or curved surface takes up the color with which the configurations had been charged, and which readily adheres to the surface of the roller or curved surface without spreading. The roller or curved surface thus impressed, and while the color upon it is undried, is passed over any object—as a board, C—it is desired to ornament with grain configurations or otherwise, when it will be found that an exact reproduction of the configurations or designs will be transferred, and by these means any design can be reproduced with the utmost fidelity and rapidity.

It is obvious that the roller B or curved surface may be operated by hand, or it may be affixed in a frame in such manner as to register, or it may be used in any desirable way, with or without additional machinery. I therefore do not wish to limit myself to using said roller or curved surface by hand; but What I do claim as new, and desire to secure by Letters Patent, is—

1. A roller or curved surface with a smooth elastic surface, as a means of transferring configurations or designs, when employed in the manner described and set forth.

2. The process hereinbefore described of transferring configurations or designs.

JOHN R. CROSS.

Witnesses:

H. L. WATTENBERG,

G. M. PLYMPTON.